(12) United States Patent
Allen

(10) Patent No.: US 7,434,473 B1
(45) Date of Patent: Oct. 14, 2008

(54) FLOW THROUGH PRESSURE TRANSDUCER

(76) Inventor: Thomas E. Allen, 9722 S. Oswego Ave., Tulsa, OK (US) 74137

( * ) Notice: Subject to any disclaimer, the term of this patent is extended or adjusted under 35 U.S.C. 154(b) by 0 days.

(21) Appl. No.: 11/827,305

(22) Filed: Jul. 11, 2007

(51) Int. Cl.
*G01L 9/00* (2006.01)
(52) U.S. Cl. .......................................... 73/720; 73/723
(58) Field of Classification Search .................. 73/723, 73/720, 706
See application file for complete search history.

(56) References Cited

U.S. PATENT DOCUMENTS

| | | | | |
|---|---|---|---|---|
| 3,937,087 | A | * | 2/1976 | Heggie ........................ 73/726 |
| 4,207,551 | A | | 6/1980 | Kautzky |
| 4,774,626 | A | | 9/1988 | Charboneau et al. |
| 4,974,596 | A | | 12/1990 | Frank |
| 4,986,135 | A | * | 1/1991 | Corser et al. ............. 73/861.42 |
| 5,313,831 | A | * | 5/1994 | Beckman ................. 73/204.24 |

OTHER PUBLICATIONS

EVR Products—Product information.

* cited by examiner

*Primary Examiner*—Andre J Allen
(74) *Attorney, Agent, or Firm*—Molly D. McKay

(57) ABSTRACT

A flow through pressure transducer for use in harsh environments like oil well cement slurry mixing process. A thin cylindrical sensor sleeve is protected from fluid wear and corrosion by a molded elastomeric sleeve provided on its internal diameter that prevents fluid from reaching the sensor sleeve. Pressure is transmitted to the sensor sleeve through the elastomeric sleeve. The sensor sleeve is mounted in such a way that the fluid pressure only exerts hoop stresses on the sensor sleeve. Two dual strain gauges are mounted on the outside of the sensor sleeve in spaced apart relationship for measuring hoop stress and an additional strain gauge is mounted 90 degrees to the stress direction for temperature compensation. The body or spool of the transducer surrounds and protects the sensor sleeve and prevents leakage in the event of sleeve failure. The spool is held in between transducer outer flanges by threaded fasteners.

19 Claims, 8 Drawing Sheets

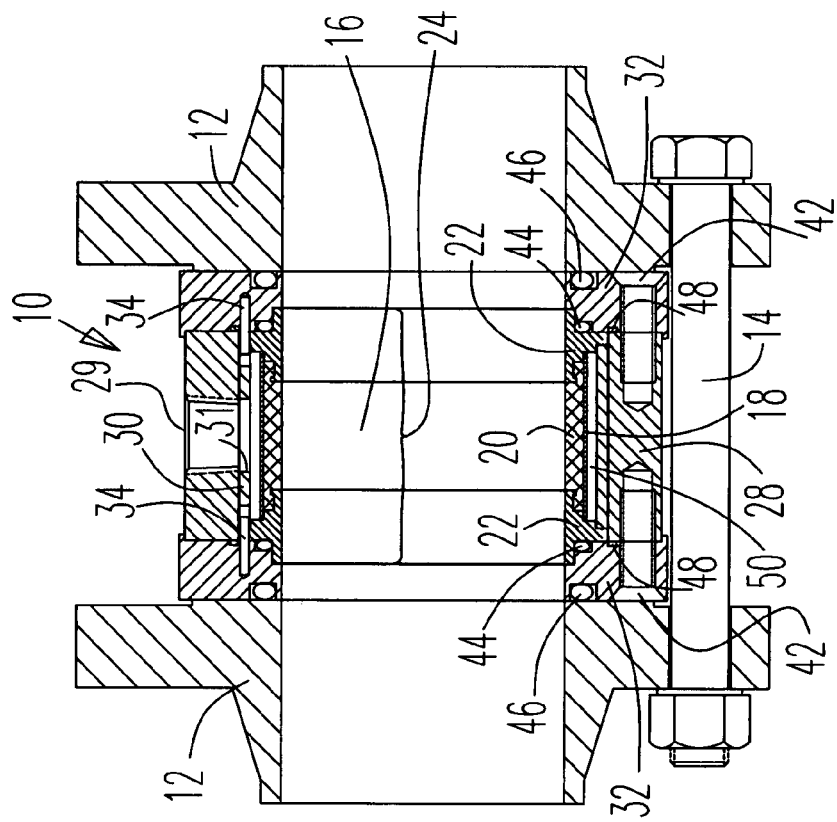
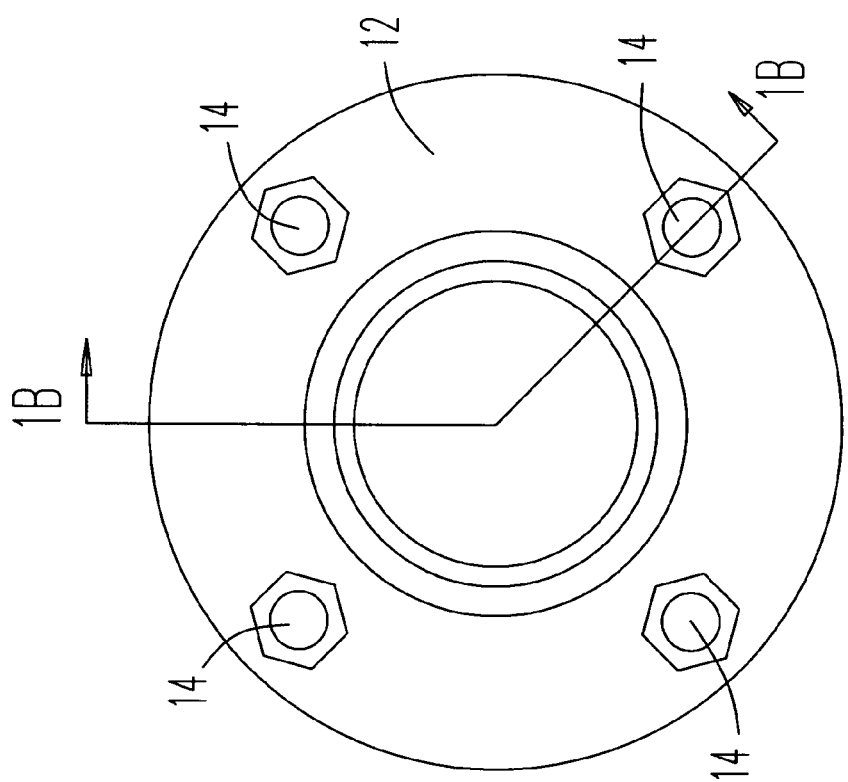
Fig. 1A
Fig. 1B

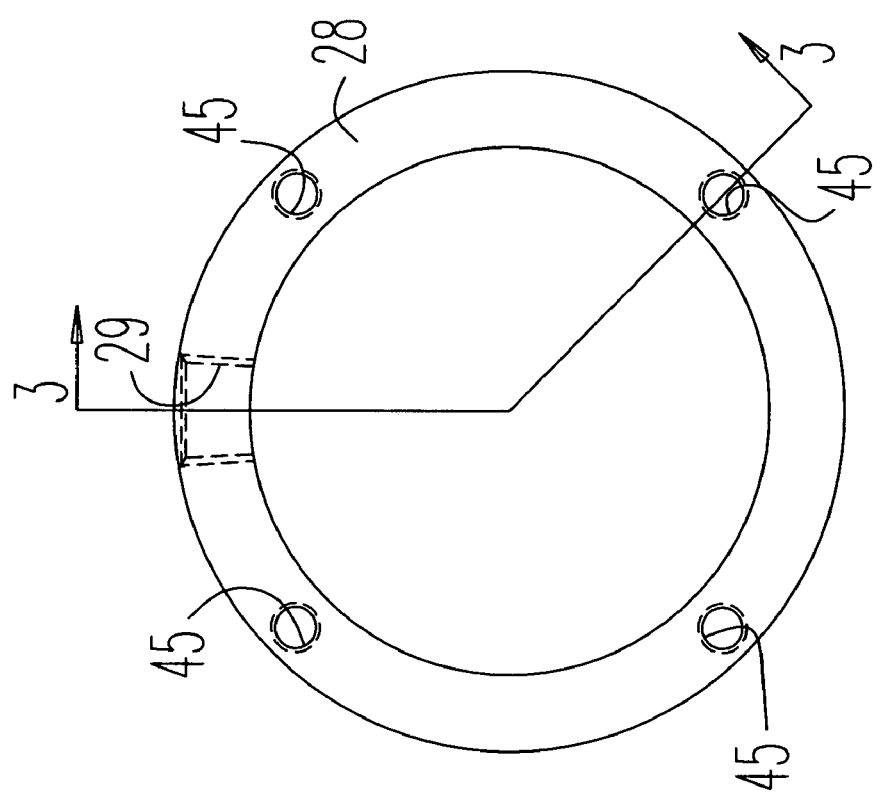
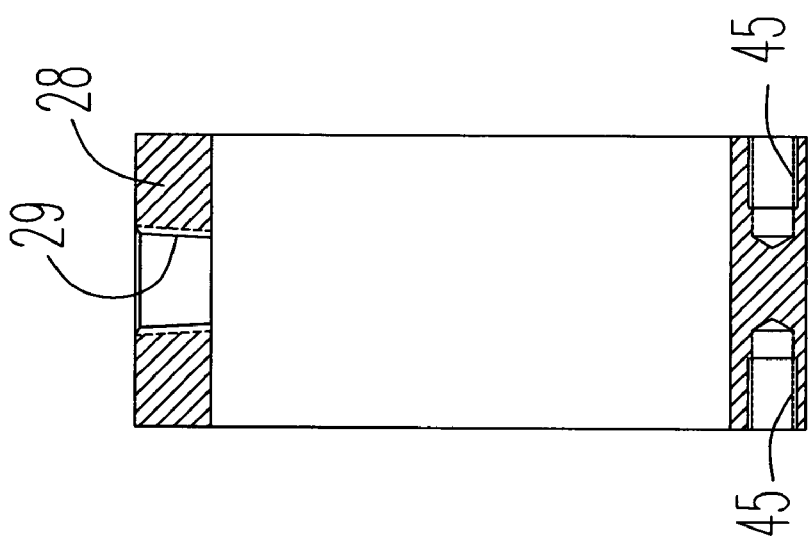

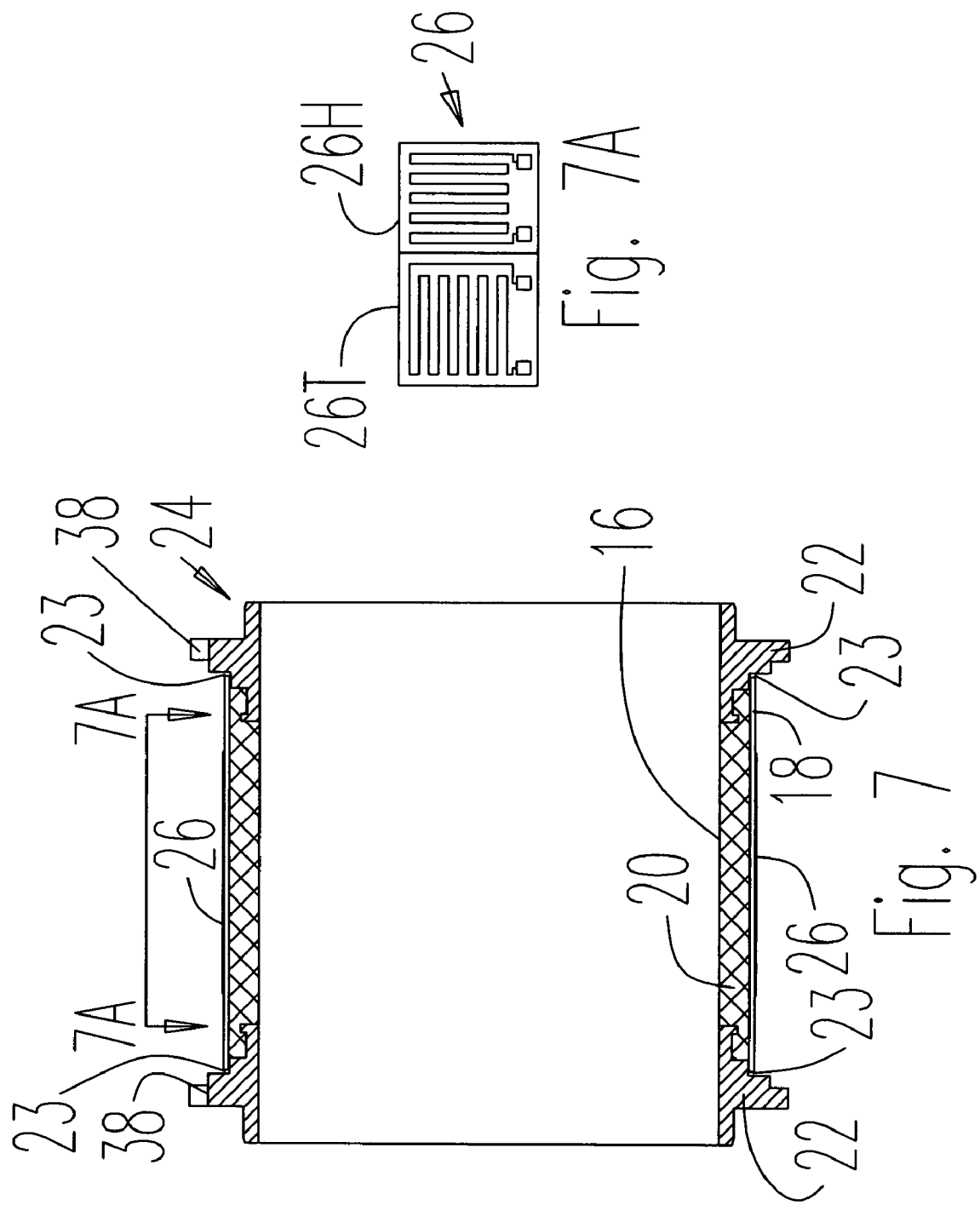

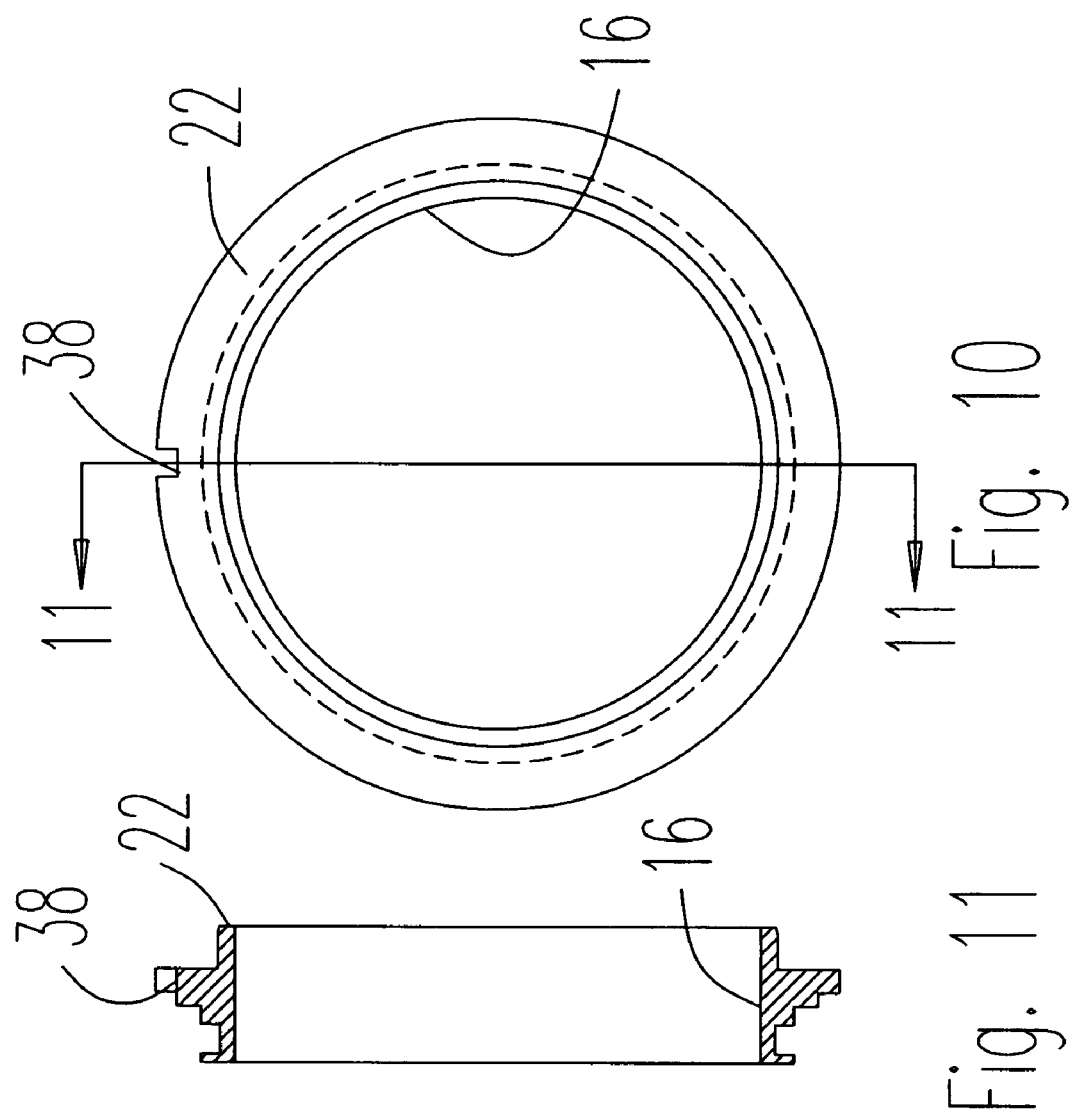

FLOW THROUGH PRESSURE TRANSDUCER

BACKGROUND OF THE INVENTION

1. Field of the Invention

The present invention relates to a flow through pressure transducer designed for harsh environments, such as for example the environment found in an oil well cement slurry mixing process.

2. Description of the Related Art

Pressure transducers that screw into a tap on the outside of process pipe are available in the industry. These transducers work for only a limited time and then fail for one of two reasons. The first reason that prior art transducers fail is that if the end of the transducer sensor is placed into or very close to the flow stream, the cement will wear the diaphragm on the end of the sensor and thereby causing it to fail. The other reason that prior art transducers fail is that if the sensor is placed farther away from the flow stream, the sensor can become fouled with set cement and therefore render it useless. The biggest problem in the past when using a pressure transducer in an oil well slurry mixing process has been the survival of the gauge in the cement slurry environment.

Also, most transducers are sealed units where repair is difficult, if not impossible.

The present invention addresses these problems with a new flow through transducer design. The invention employs a thin cylindrical sensor sleeve to sense the pressure. The thin metal sleeve is protected from potential fluid wear and corrosion by a molded elastomeric sleeve on its internal diameter. The elastomeric protective sleeve is molded into the internal diameter of the sensor sleeve such that no fluid reaches the sensor sleeve. Pressure is transmitted to the sensor sleeve through the elastomeric sleeve. The elastomeric sleeve protects the cylindrical sensor sleeve from both wear and corrosion from fluids passing through the transducer.

The sensing element is a thin metal sleeve that is unrestrained in the axial direction, thereby preventing the sensing element from being subjected to axial pressure induced stresses. No structural loads are transmitted to the sleeve. The sensor sleeve is mounted in such a way that the sensor internal pressure only loads the sleeve in a hoop stress direction and subjects the sensor sleeve only to hoop stresses.

Pressure exerted on the inside of the sensing element causes hoop stress on the sensing element. The strain gauge senses this hoop stress. Thus, the output of the strain gauge is proportional to the amount of pressure exerted on the inside of the sensing element by the fluid flowing through it.

Two dual strain gauges are mounted on the outside of the sensor sleeve in spaced apart relationship. Each dual strain gauge has a gauge for measuring hoop stress and a second strain gauge mounted at a 90 degree angle to the first strain gauge for providing temperature compensation. A bridge output amplifier is used to provide a stable power supply input to the gauges, to amplify the signal, to allow zeroing the output and to adjust the output span.

The present invention was designed for mounting in a 3" pipe with a working pressure of 150 psi. However other sizes, larger or smaller, could be easily made based on this design, and the sleeve thickness could easily be increased to measure higher pressures.

The body of the transducer forms a spool surrounding the sensor sleeve. The spool is held in place by transducer outer flanges that secure to the spool via threaded fasteners. In case the sensor sleeve failed, the body of the transducer which surrounds the sensor sleeve would catch any escaping fluid and prevent fluid from discharging outside the sensor. The spool assembly also prevents exterior damage to the thin sensor sleeve.

The present invention improves over the prior art in that it cannot become plugged with cement or other material and its sensor sleeve is protected from fluid erosion and corrosion by its molded elastomeric inner sleeve.

Further, the present transducer can be disassembled and repaired. This allows the sensor sleeve assembly of the present invention to be replaced with different pressure rated sleeves and with sleeves containing elastomers with different chemical compatibilities.

SUMMARY OF THE INVENTION

The present invention is a flow through pressure transducer that is designed for use in harsh environments, such as found in an oil well slurry mixing process. The invention employs a thin cylindrical sensor sleeve as the sensing element to sense the pressure. The thin metal sleeve is protected from potential fluid wear and corrosion by a molded elastomeric sleeve on its internal diameter that prevents fluid from reaching the sensor sleeve. Pressure is transmitted to the sensor sleeve through the elastomeric sleeve.

The sensor sleeve is mounted in such a way that the fluid pressure only exerts hoop stresses on the sensor sleeve. The sensor sleeve is unrestrained in the axial direction and therefore is not subjected to axial pressure induced stresses.

Two dual strain gauges are mounted on the outside of the sensor sleeve in spaced apart relationship. Each dual strain gauge has a gauge for measuring hoop stress and a second strain gauge for providing temperature compensation. A bridge output amplifier is used to provide a stable power supply input to the gauges, to amplify the signal, to allow zeroing the output and to adjust the output span.

The body of the transducer forms a spool surrounding the sensor sleeve. The spool is held in place by transducer outer flanges that secure to the spool via threaded fasteners. In case the sensor sleeve failed, the body of the transducer which surrounds the sensor sleeve would catch any escaping fluid and prevent fluid from discharging outside the sensor. The spool assembly also prevents damage to the thin sensor sleeve.

BRIEF DESCRIPTION OF THE DRAWINGS

FIG. 1A is an end view of a flow through pressure transducer constructed in accordance with a preferred embodiment of the present invention, FIG. 1B is a cross sectional view of the flow through pressure transducer taken along line 1B-1B of FIG. 1A, and showing the flow through pressure transducer secured between a pair of adaptor flanges.

FIG. 2 is an end view of the spool or transducer body of FIG. 1 shown removed from the flow through pressure transducer.

FIG. 3 is a cross sectional view of the spool or transducer body taken along line 3-3 of FIG. 2.

FIG. 7 is a cross sectional view of the sensor sleeve assembly shown removed from the flow through pressure transducer of FIG. 1.

FIG. 7A is a top plan view of a dual strain gauge taken along line 7A-7A of FIG. 7.

FIG. 10 is an end view of an adaptor ring of FIG. 7 shown removed from the sensor sleeve assembly.

FIG. 11 is a cross sectional view of the adaptor ring taken along line 11-11 of FIG. 10.

DETAILED DESCRIPTION OF THE PREFERRED EMBODIMENT

Figure 6:
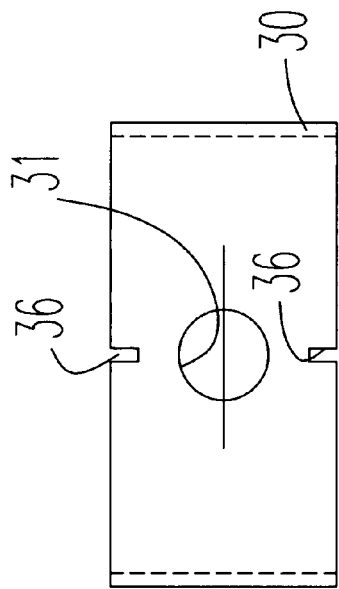
FIG. 6 is a top plan view of the spacer ring taken along line 6-6 of FIG. 4.

Referring now to the drawings and initially to FIGS. 1A and 1B, there is illustrated a flow through pressure transducer 10 that is constructed in accordance with a preferred embodiment of the present invention. The flow through pressure transducer 10 is designed for use in harsh environments, such as found in an oil well slurry mixing process.

The flow through pressure transducer 10 is shown secured between two adaptor flanges 12 with bolts 14. The adaptor flanges 12 would normally be welded in-line in a cement slurry line (not illustrated) so that cement slurry would pass through a fluid passageway 16 of the flow through pressure transducer 10.

Figure 8:
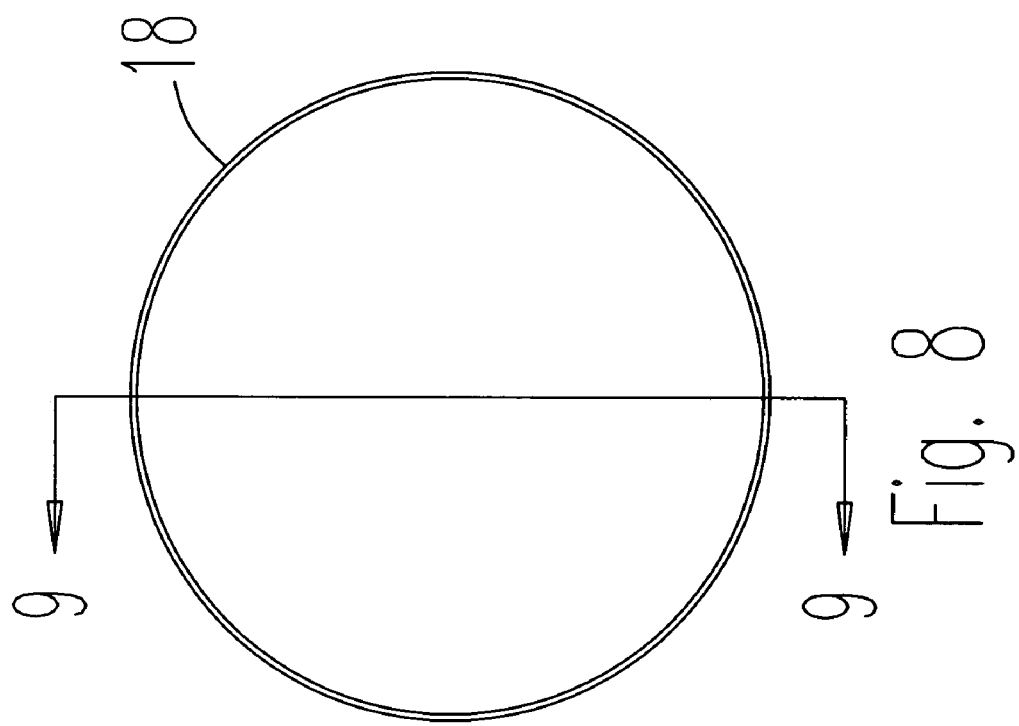
FIG. 8 is an end view of the sensor sleeve of FIG. 7 shown removed from the sensor sleeve assembly.
Figure 9:
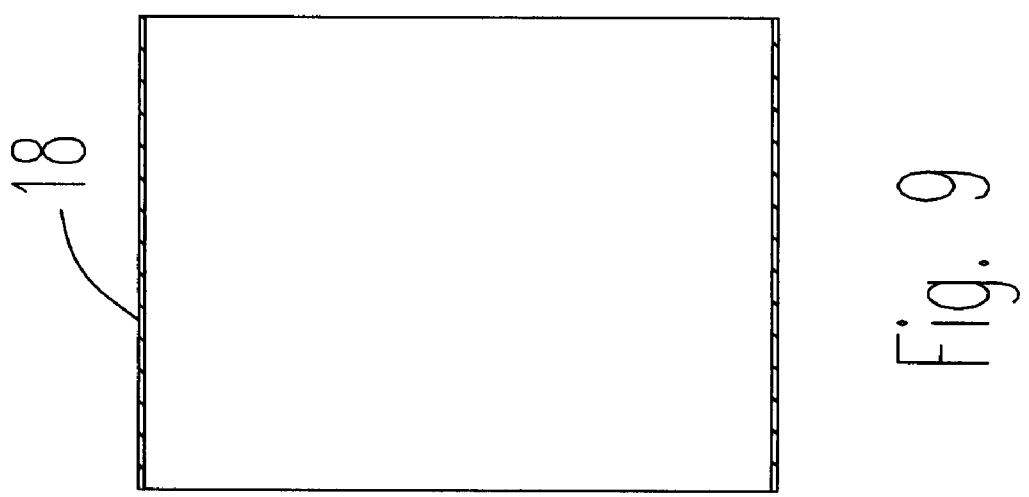
FIG. 9 is a cross sectional view of the sensor sleeve taken along line 9-9 of FIG. 8.
Figure 12:
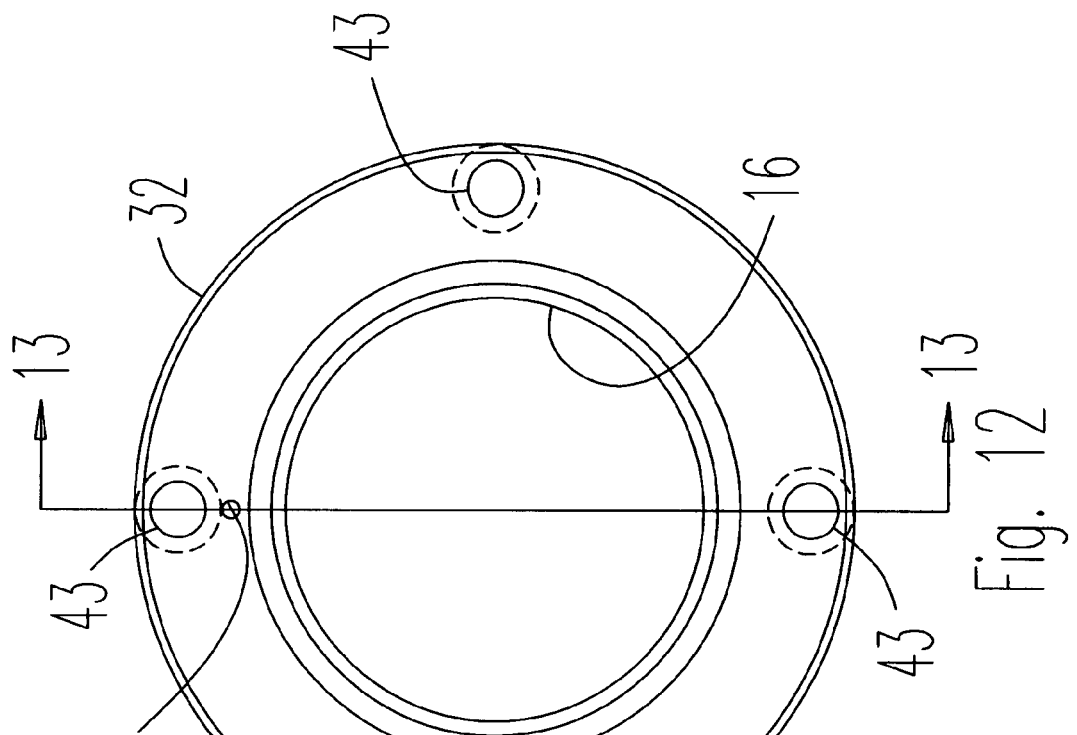
FIG. 12 is an end view of one of the transducer outer flanges shown removed from the flow through pressure transducer of FIG. 1.
Figure 13:
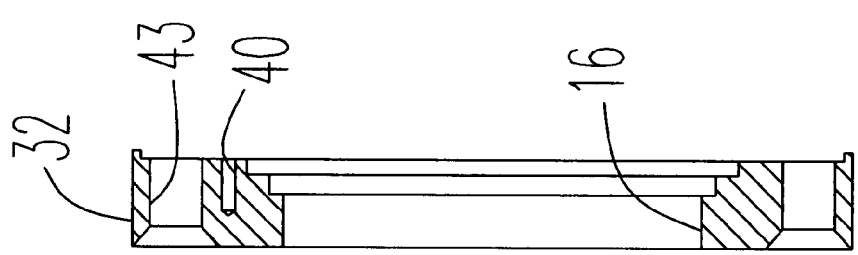
FIG. 13 is a cross sectional view of the transducer outer flange taken along line 13-13 of FIG. 12.

Referring also to FIGS. 7, 8, and 9, the invention 10 employs a thin cylindrical sensor sleeve 18 as the sensing element to sense the fluid pressure of the fluid as it flows through the fluid passageway 16. The cylindrical sensor sleeve 18 is preferably constructed of metal, generally steel, and is protected from potential fluid wear and corrosion by a molded elastomeric sleeve 20 provided on its internal diameter that prevents fluid from reaching the sensor sleeve 18. Pressure is transmitted to the sensor sleeve 18 through the elastomeric sleeve 20.

Referring also to FIG. 7, the sensor sleeve 18 is mounted between two adaptor rings 22 in such a way that the fluid pressure only exerts hoop stresses on the sensor sleeve 18. As shown in FIG. 7, there are gaps 23 between the sensor sleeve 18 and the two adaptor rings 22 to prevent axial pressure induced stresses on the sensor sleeve 18. FIGS. 10 and 11 show one of the adaptor rings 22 in detail. Because the sensor sleeve 18 is unrestrained in the axial direction, it is therefore not subjected to axial pressure induced stresses. Together the sensor sleeve 18, the elastomeric sleeve 20 and the two adaptor rings 22 form the sensor sleeve assembly 24 illustrated in FIG. 7.

Referring to FIG. 7, two dual strain gauges 26 are mounted on the outside of the sensor sleeve 18 in spaced apart relationship. As shown in FIG. 7A, each dual strain gauge 26 has a first strain gauge 26H for measuring hoop stress and a second strain gauge 26T at approximately 90 degrees from the first strain gauge for providing temperature compensation. A bridge output amplifier (not illustrated) is used to provide a stable power supply input to the gauges 26, to amplify the signal, to allow zeroing the output and to adjust the output span.

Figure 4:
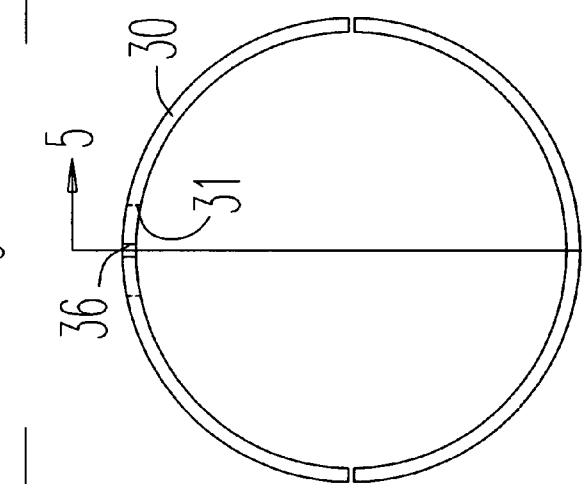
FIG. 4 is an end view of the spacer ring of FIG. 1 shown removed from the flow through pressure transducer.
Figure 5:
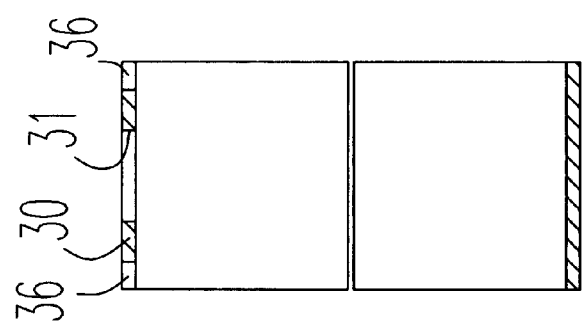
FIG. 5 is a cross sectional view of the spacer ring taken along line 5-5 of FIG. 4.

Referring now to FIGS. 1A, 1B, 2, 3, 4, 5, and 6, the body of the transducer 10 forms a spool 28 surrounding the sensor sleeve assembly 24. The spool 28 and the spacer ring 30 are each provided with an opening 29 and 31, respectively that extend therethrough for admitting the connections that attach to the dual strain gauges 26. The spool 28 is spaced apart from the sensor sleeve 18 by a spacer ring 30 and is secured between two transducer outer flanges 32. The spacer ring 30 is shown in detail in FIGS. 4, 5, and 6. As illustrated in FIGS. 4-6, the spacer ring 30 is preferably split into two halves for ease in installation. The spacer ring 30, the adaptor rings 22, and transducer outer flanges 32 are all held in proper alignment with alignment pins 34, shown in FIG. 1B. Referring also to FIGS. 4-6, 10-11, and 12-13, the alignment pins 34 insert into pin slots 36 and 38 provided, respectively, in the spacer ring 30 and the adaptor rings 22, and into pin openings 40 provided in the transducer outer flanges 32. The spool 28 is held in place by the transducer outer flanges 32 that secure to the spool 28 via threaded fasteners 42 that secure through fastener openings 43 provided in the transducer outer flanges 32 and thread into threaded openings provided in the spool 28.

Referring again to FIG. 1B, a first o-ring seal 44 is located between each adaptor ring 22 of the sensor sleeve assembly 24 and its associated transducer outer flange 32 to seal so that fluid passing through the hollow interior passageway 16 of the invention 10 does not pass therebetween. A second o-ring seal 46 is located between each transducer outer flange 32 and its associated adaptor flange 12 to seal so that fluid passing through the hollow interior passageway 16 of the invention 10 does not pass therebetween. A third o-ring seal 48 is located between the spool 28 and each of the transducer outer flanges 32 to seal therebetween. The third o-ring seals 48 are to prevent moisture from entering the strain gauge space 50 from outside and confining fluid in the event that the sensor sleeve assembly 24 fails. In that event, the body of the transducer 10 which surrounds the sensor sleeve 18 would catch any escaping fluid and thus prevent fluid from discharging outside the invention 10. The spool 28 assembly also prevents damage to the thin sensor sleeve 18.

Test Results

The invention 10 was tested by attaching blind flanges to both ends of the invention 10 and then applying air pressure to the interior passageway 16 of the sensor sleeve assembly 24. An amplifier was used to amplify the output and a pressure regulator was used to adjust the air pressure that was applied to the interior passageway of the transducer 10. A voltmeter was used to read the output voltage.

Figure 14:
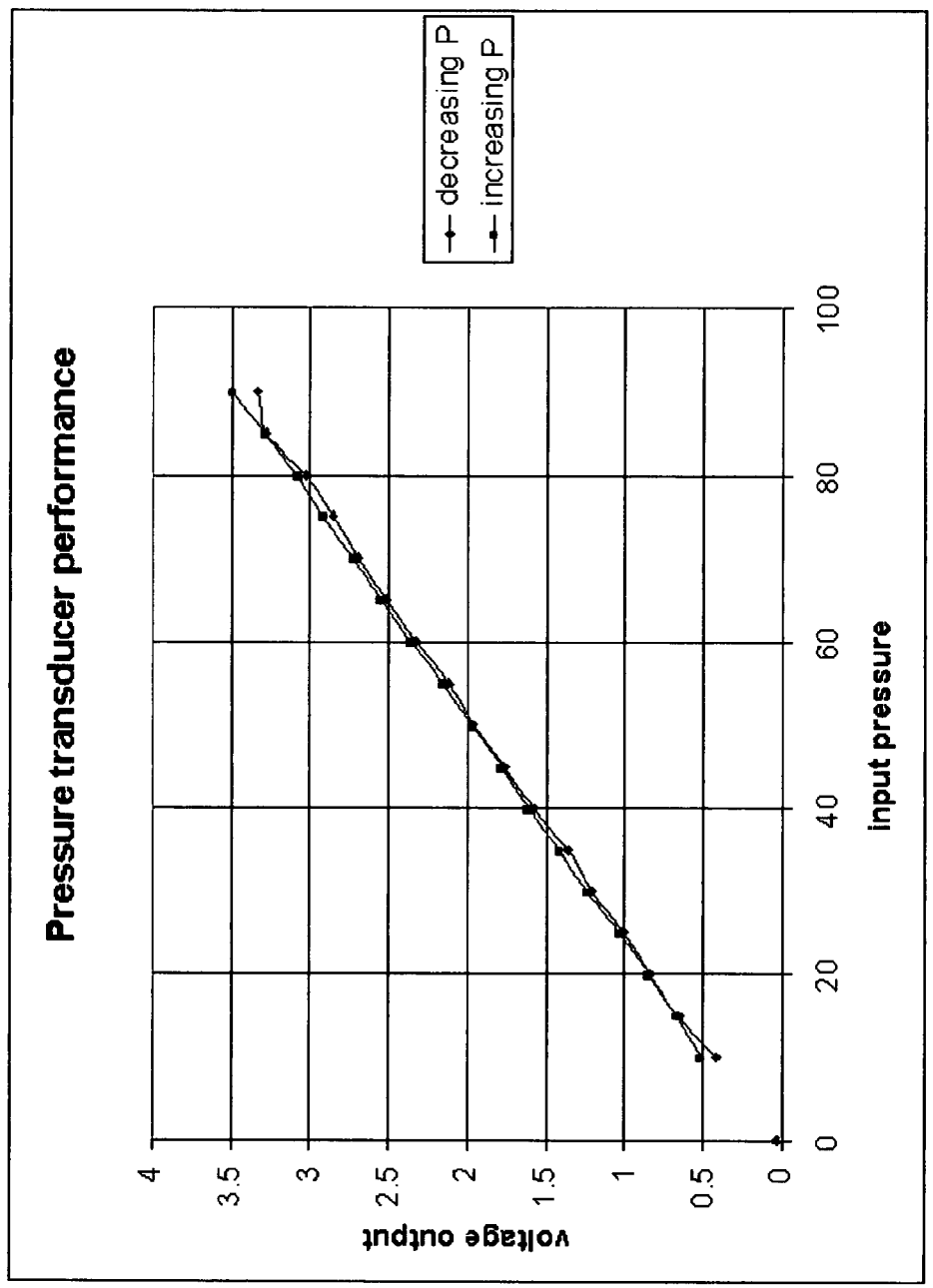
FIG. 14 is a graph of test data obtained employing the pressure transducer of the present invention. showing the relationship between input pressure and voltage output.

Referring now to FIG. 14, the test data for this test is shown as a graph. Performance of the transducer 10 was tested in both increasing and decreasing pressure modes. The test data obtained shows that the transducer 10 produced a linear response in terms of amplified voltage output of the transducer 10 verses the input pressure. The data showed good linearity and was responsive to small changes in actual pressure. The intended application for this transducer 10 does not require a high accuracy gauge. If desired, the overall pressure transducer's accuracy can be improved by using higher quality gauges 26, better strain gauge adhesives and better temperature compensation. This is all possible but adds to the cost. For the cementing applications this is not necessary, but it might be desirable for other applications.

Although the invention 10 has been described for use in cementing operations, its use in not so limited. The invention 10 can be employed in a wide variety of applications where a flow through pressure transducer might be desirable.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A flow through pressure transducer for use in harsh environments comprising:
   a thin cylindrical sensor sleeve,
   an elastomeric sleeve provided on the internal diameter of the sensor sleeve so that the elastomeric sleeve prevents fluid that is flowing though the sensor sleeve from reaching the sensor sleeve while allowing fluid pressure to be transmitted to the sensor sleeve through the elastomeric sleeve, and
   at least one strain gauge mounted on the outside of the sensor sleeve for measuring hoop stress.

2. A flow through pressure transducer for use in harsh environments according to claim 1 further comprising:
   strain gauges mounted on the outside of the sensor sleeve in spaced apart relationship for measuring hoop stress.

3. A flow through pressure transducer for use in harsh environments according to claim 2 further comprising:
   at least one strain gauge mounted 90 degrees to the stress strain gauge direction to provide temperature compensation.

4. A flow through pressure transducer for use in harsh environments according to claim 1 further comprising:
   a spool of the transducer surrounding the sensor sleeve and preventing leakage in the event of sensor sleeve failure and protecting gauge from damage due to moisture and physical damage.

5. A flow through pressure transducer for use in harsh environments according to claim 4 further comprising:
   said spool held between transducer outer flanges by fasteners.

6. A flow through pressure transducer for use in harsh environments according to claim 1 further comprising:
   means for mounting the sensor sleeve such that fluid flowing through the sensor sleeve exerts only hoop stresses on the sensor sleeve.

7. A flow through pressure transducer for use in harsh environments according to claim 6 wherein said means for mounting the sensor sleeve further comprises:
   said sensor sleeve mounted between two adaptor rings.

8. A flow through pressure transducer for use in harsh environments according to claim 7 wherein said means for mounting the sensor sleeve further comprises:
   a spool formed from the body of the transducer surrounding the sensor sleeve, said spool secured between transducer outer flanges by fasteners.

9. A flow through pressure transducer for use in harsh environments according to claim 8 further comprising:
   a spacer ring provided between the spool and the sensor ring.

10. A flow through pressure transducer for use in harsh environments according to claim 9 further comprising:
    alignment pins that insert into pin slots provided in the spacer ring and the adaptor rings, respectively, and into pin openings provided in the transducer outer flanges to hold them in proper alignment.

11. A flow through pressure transducer for use in harsh environments according to claim 8 further comprising:
    first o-ring seals located between each adaptor ring and its associated transducer outer flange to seal so that fluid passing through the sensor sleeve does not pass between the adaptor rings and the outer flanges.

12. A flow through pressure transducer for use in harsh environments according to claim 8 further comprising:
    second o-ring seals located between each transducer outer flange and its associated adaptor flange to seal so that fluid passing through the sensor sleeve does not pass between the transducer outer flanges and the adaptor flanges.

13. A flow through pressure transducer for use in harsh environments according to claim 8 further comprising:
    third o-ring seals located between the spool and each of the transducer outer flanges to seal therebetween.

14. A flow through pressure transducer for use in harsh environments according to claim 1 further comprising:
    means for securing the sensor sleeve in a fluid line so that fluid flows through the sensor sleeve.

15. A method for measuring liquid pressure comprising:
    passing liquid through a hollow sensor sleeve to which a strain gauge is attached externally so that the strain gauge measures the hoop stress on the hollow sensor sleeve caused by the pressure of the liquid as it passes through the sensor sleeve,
    measuring the hoop stress on the sensor sleeve with the strain gauge, and
    converting the hoop stress measurement to a pressure value.

16. A method for measuring liquid pressure according to claim 15 further comprising:
    providing temperature compensation to the measured hoop stress on the sensor sleeve to compensate for the expansion of the strain gauge due to temperature.

17. A method for measuring liquid pressure according to claim 15 further comprising:
    protecting the interior of the sensor sleeve with an elastomeric sleeve provided on the internal diameter of the sensor sleeve so that the elastomeric sleeve prevents fluid that is flowing though the sensor sleeve from reaching the sensor sleeve while allowing fluid pressure to be transmitted to the sensor sleeve through the elastomeric sleeve.

18. A method for making a flow-through pressure transducer comprising:
    securing a strain gauge on the exterior of a sensor sleeve so that the strain gauge measures hoop stress on the sensor sleeve caused by the pressure of the liquid flowing through the sensor sleeve,
    lining the sensor sleeve with a flexible protective liner so that the liner allows hoop stress to be transmitted to the interior of the sensor sleeve from the liquid flowing through the sensor sleeve without allowing the liquid to contact the interior of the sensor sleeve.

19. A method for making a flow-through pressure transducer according to claim 18 further comprising:
    securing a second strain gauge at approximately 90 degrees to the first strain gauge on the exterior of a sensor sleeve to provide temperature compensation for the measurements of the first strain gauge.

* * * * *